Oct. 6, 1970   H. B. CASEY ET AL   3,533,042
SUBMINIATURE TRIMMER POTENTIOMETER
Filed Feb. 4, 1969   4 Sheets-Sheet 2
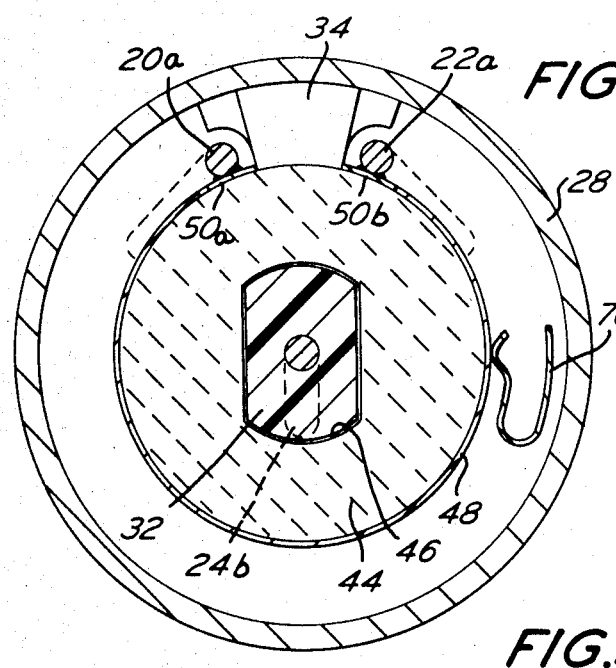
FIG. 4
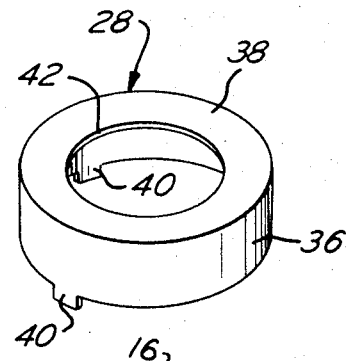
FIG. 5
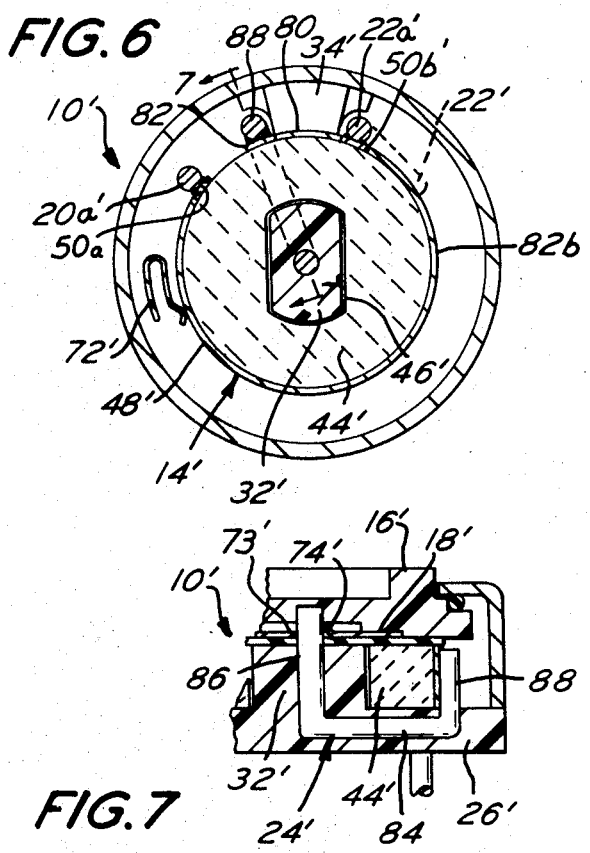
FIG. 6
FIG. 7
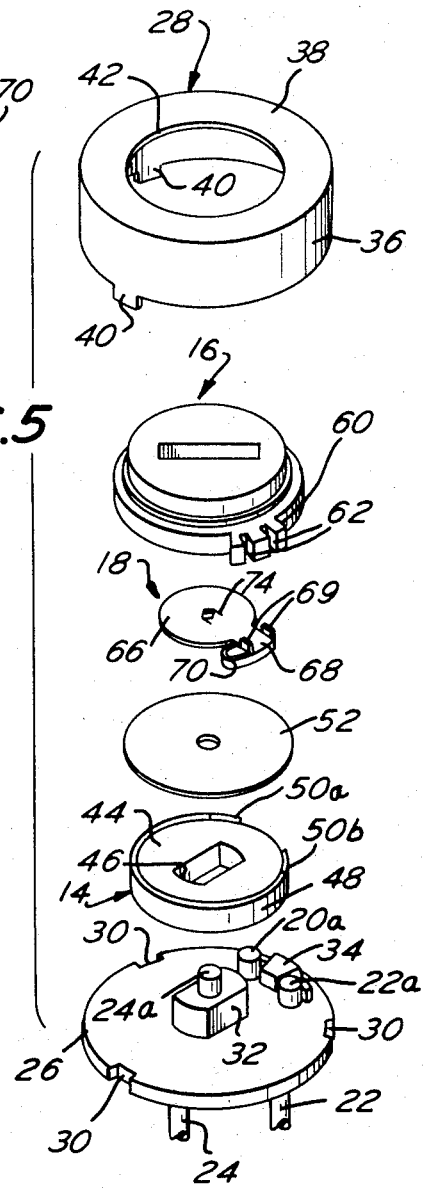
INVENTORS.
HARRY B. CASEY
JOHN G. WOODS
GEORGE W. WOOD
ATTORNEY

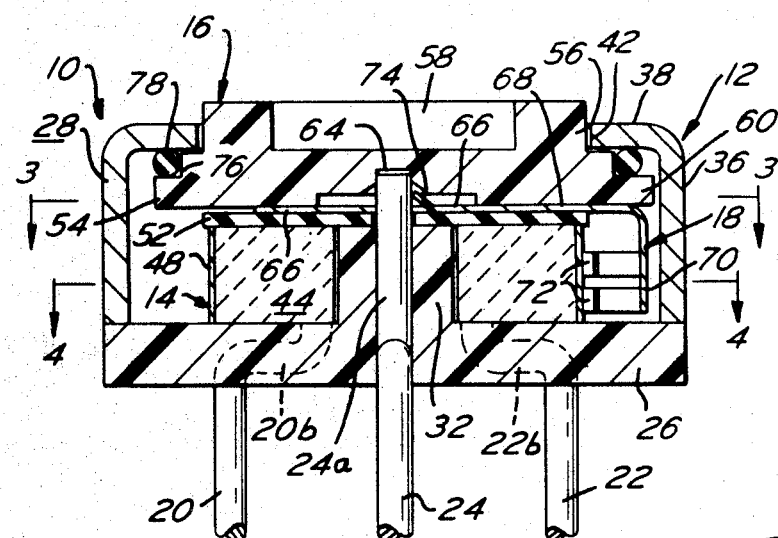
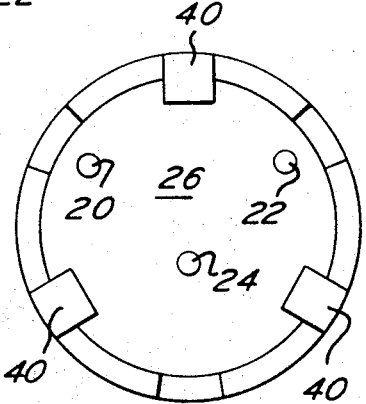
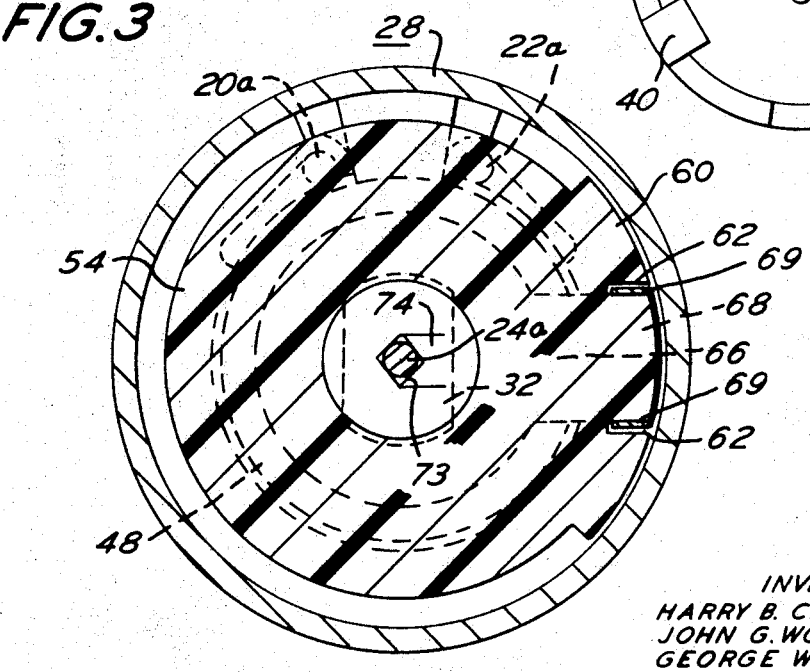

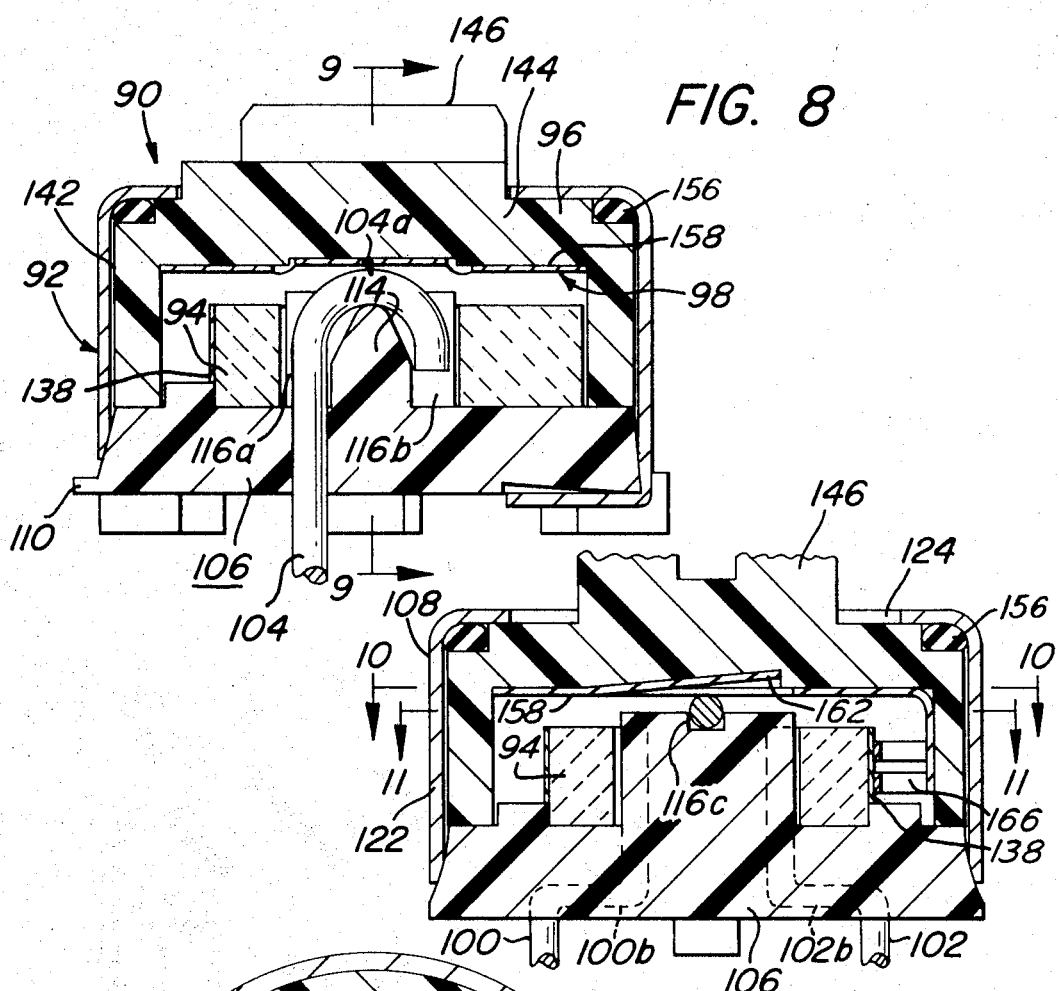

Oct. 6, 1970 H. B. CASEY ET AL 3,533,042

SUBMINIATURE TRIMMER POTENTIOMETER

Filed Feb. 4, 1969 4 Sheets-Sheet 4

INVENTORS
HARRY B. CASEY
JOHN G. WOODS
GEORGE W. WOOD
BY

ATTORNEY

United States Patent Office 3,533,042
Patented Oct. 6, 1970

3,533,042
SUBMINIATURE TRIMMER POTENTIOMETER
Harry B. Casey, Willow Grove, and John G. Woods, Philadelphia, Pa., and George W. Wood, Hammonton, N.J., assignors to TRW Inc., Philadelphia, Pa., a corporation of Ohio
Continuation-in-part of application Ser. No. 721,267, Apr. 15, 1968. This application Feb. 4, 1969, Ser. No. 796,471
Int. Cl. H01c 9/00
U.S. Cl. 338—162          10 Claims

ABSTRACT OF THE DISCLOSURE

A subminiature trimmer potentiometer comprising a circular base having a post in the center thereof. A circular disk of an electrical insulating material having an opening in the center thereof is mounted on the base with the post extending through the opening in the disk. A resistance film is coated on the peripheral surface of the disk. A circular rotor is rotatably mounted over the disk. A metal contact is connected to the rotor to rotate therewith and slidably engages the resistance film. A cup-shaped cover is mounted on and secured to the base and encloses the disk and the rotor. The cover has an opening therethrough through which the rotor projects so that the rotor is accessible from outside the cover. Terminal wires are carried by the base with one of the terminal wires being electrically connected to the contact and the other terminal wires being electrically connected to the resistance film.

Cross Reference To Related Cases

This is a continuation-in-part of the application of Harry B. Casey, John G. Woods and George W. Wood, Ser. No. 721,267, filed Apr. 15, 1968 entitled "Subminiature Trimmer Potentiometer," now Pat. No. 3,484,734.

Background

With the trend in the electronics industry to making electronic equipment smaller and more compact, there has developed an element for miniaturized and subminiaturized electrical components. In the electrical resistor field, a major problem in meeting this demand has been with regard to variable resistors, such as rheostats and potentiometers. In developing subminiature potentiometers, i.e. potentiometers as small as one-quarter inch in diameter, it has been found that merely reducing the size of previously used potentiometers is not satisfactory. If the parts of such previously used potentiometers are merely reduced in size, even by only one-half, the parts become so small that they are extremely difficult to make, handle and assemble together with the potentiometer. Therefore, it has been found necessary to redesign the potentiometers and minimize the number of parts making up the potentiometer so that the parts can be easily made and then easily and quickly assembled into the potentiometer.

Summary of invention

It is an object of the present invention to provide a novel construction of a subminiature trimmer potentiometer.

It is another object of the present invention to provide a subminiature trimmer potentiometer which is made up of a minimum number of parts and which can be easily assembled.

It is a further object of the present invention to provide a subminiature trimmer potentiometer which can include a fixed resistance in a series-parallel arrangement with the variable resistance element of the potentiometer without increasing the size of the potentiometer.

These objects are achieved by a potentiometer comprising a housing having a circular base and a cup-shaped cover mounted on and secured to the base. The base has a post in the center of its inner surface, and the cover has an opening in its upper surface. A circular disk shaped resistance element having a central opening therethrough is mounted on the inner surface of the base with the post extending through the opening in the resistance element. A film of a resistance material is coated on the outer cylindrical surface of the resistance element. The resistance element and base have engaging surfaces which properly positions the resistance element on the base and prevents relative rotation between the resistance element and the base. A contact terminal wire extends through the base and the post. An additional pair of terminal wires extend through the base and are electrically connected to the resistance film on the resistance element. A rotor is rotatably mounted within the cover and over the resistance element. A portion of the rotor projects through the opening in the cover to permit rotation of the rotor. A contact is carried by the rotor. The contact slidably engages the resistance film on the resistance element and the contact terminal wire.

Brief description of drawings

For the purpose of illustrating the invention, there is shown in the drawings forms which are presently preferred; it being understood, however, that this invention is not limited to the precise arrangements and instrumentalities shown.

FIG. 1 is a transverse sectional view of the trimmer potentiometer of the present invention.

FIG. 2 is a bottom plan view of the trimmer potentiometer of the present invention.

FIG. 3 is a sectional view taken along line 3—3 of FIG. 1.

FIG. 4 is a sectional view taken along line 4—4 of FIG. 1.

FIG. 5 is an exploded perspective view of the trimmer potentiometer of the present invention.

FIG. 6 is a sectional view similar to FIG. 4 but showing a modification of the trimmer potentiometer of the present invention which includes a fixed resistance in a series-parallel arrangement with the variable resistance element.

FIG. 7 is a sectional view taken along line 7—7 of FIG. 6.

FIG. 8 is a transverse sectional view of still another modification of the trimmer potentiometer of the present invention.

FIG. 9 is a sectional view taken along line 9—9 of FIG. 8.

FIG. 10 is a sectional view taken along line 10—10 of FIG. 9.

Description of invention

Figure 11:
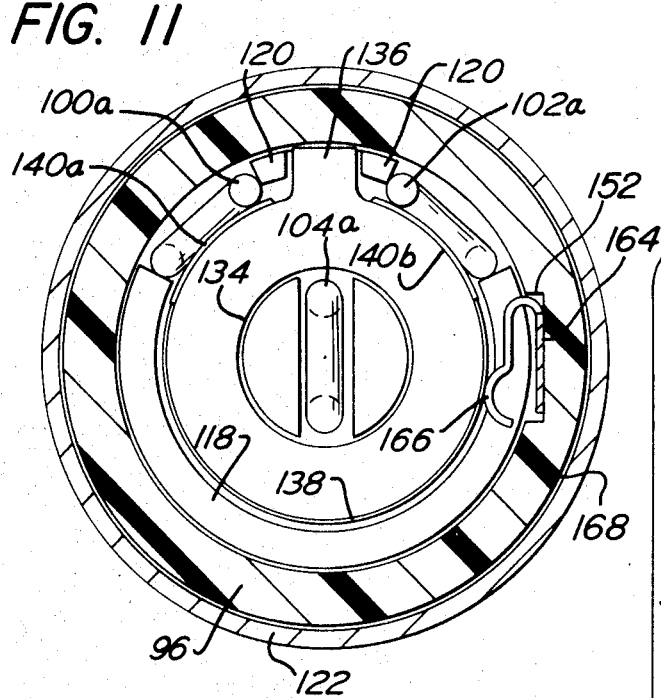
FIG. 11 is a sectional view taken along line 11—11 of FIG. 9.

Referring initially to FIGS. 1–5 of the drawings, the trimmer potentiometer of the present invention is generally designated as 10. In general, potentiometer 10 comprises a cylindrical housing, generally designated as 12, which can be as small as one-quarter inch in diameter and approximately 3/16 inch in height. A resistance element 14 is mounted in the housing 12, and a rotor 16 is rotatably mounted in the housing and projects through an opening in the housing. A contact 18 is carried by the rotor and slidably engages the resistance element 14. Three terminal wires 20, 22, and 24 extend through the housing with the terminal wires 20 and 22 being connected to the resistance element 14 and the terminal wire 24 being connected to the contact 18. Thus, rotation of the rotor 16 moves the contact 18 along the resistance element 14 to vary the resistance value setting of the potentiometer 10.

More specifically, the housing 12 comprises a base 26 and a cover 28. The base 26 is a flat, circular disk of an electrical insulating material, such as a plastic. The base has three notches 30 in its edges uniformally spaced therearound (see FIG. 5). A non-circular post 32 is integral with and projects upwardly from the center of the base 26. A wedge-shaped stop lug 34 is integral with and projects upwardly from the base 26 adjacent the edge of the base.

As shown, the terminal wires 20, 22 and 24 are mounted on and secured to the base 26 during the molding of the base. The contact terminal wire 24 has an upper portion 24a which extends upwardly through the center of the post 32 and projects above the top of the post (see FIG. 1). The resistor terminal wires 20 and 22 have upper portions 20a and 22a respectively which extend upwardly from the top surface of the base 26 at opposite sides of the stop lug 34 (see FIG. 4). The terminal wires 20, 22 and 24 have intermediate bent portions 20b, 22b and 24b respectively which are completely within and extend across a portion of the base 26 so as to mechanically secure the terminal wires to the base.

The cover 28, which is made of metal, is cup-shaped having a cylindrical outer wall 36 and a flat, circular top wall 38. The outer wall 36 of the cover 28 is mounted on the base 26. Three spaced tabs 40 project from the end of the outer wall 36 (see FIG. 5). The tabs 40 extend through the notches 30 in the base 26 and, as shown in FIG. 2, are bent across the bottom surface of the base to secure the cover 28 to the base. The top wall 38 of the cover 28 has a circular, central opening 42 therethrough.

Resistance element 14 comprises a flat, circular disk 44 of an electrical insulating material, such as a ceramic or plastic having a non-circular opening 46 through the center thereof which is of the same size and shape as the post 32 on the base 26. The disk 44 is seated on the base 26 with the post 32 extending through the opening 46 of the disk so as to prevent relative rotation between the disk and the base. The disk 44 is of a thickness substantially the hight of the post 32 and of a diameter to extend to the stop lug 34. A film 48 of a resistance material is coated on and extends almost completely around the peripheral edge of the disk 44. The resistance film 48 may be of any well-known electrical resistance material such as carbon or a metal either with or without a binder. The resistance film 48 has spaced apart ends which are positioned adjacent opposite sides of the stop lug 34. Termination films 50a and 50b of an electrically conductive metal are coated across the edge of the disk 44 at the ends of and contacting the resistance film 48. As shown in FIG. 4, the upright portions 20a and 22a of the resistor terminal wires 20 and 22 extend along the termination films 50a and 50b and are electrically connected thereto by either a solder or an electrically conductive cement. Thus, the resistor terminal wires 20 and 22 are electrically connected to opposite ends of the resistance film 48. This also mechanically secures the resistance element 14 to the base 26 of the housing 12. A thin, circular sheet 52 of an electrical insulation material, such as a plastic, is seated on the top of the resistance element 14 and extends radially slightly beyond the edge of the resistance element.

Rotor 16 comprises a circular disk 54 of an electrical insulation material, such as a plastic, of a diameter greater than the diameter of the resistance element 14 but less than the internal diameter of the cover wall 36 and of a thickness substantially equal to the distance between the resistance element 14 and the top wall 38 of the cover 28. A circular hub 56 is integral with and projects upwardly from the center of the disk 54. The hub 56 is of a diameter substantially equal to the diameter of the opening 42 in the top wall 38 of the cover 28 and projects through the opening 42 so as to be accessible from outside the cover. A tranverse slot 58 is provided across the top surface of the hub 56. The slot 58 is adapted to receive a screw driver or similar tool to rotate the rotor 16. A widge-shaped stop lug 60 projects radially from the edge of the disk 54. The sides of the stop lug 60 are tapered to mate with the tapered sides of the stop lug 34 on the base so that engagement of the rotor stop lug 60 with the base stop lug 34 limits the degree of rotation of the rotor 16. A pair of spaced, parallel notches 62 are provided in the outer edge of the stop lug 60. A blind hole 64 is provided in the center of the bottom surface of the disk 54. The hole 64 is of a diameter substantially equal to the diameter of the contact terminal wire 24 so that the upright portion 24a of the contact terminal wire 24 fits into the hole 64. An annular groove 76 is provided in the upper surface of the rotor disk 54 at the edge thereof. An annular sealing ring 78 is seated in the groove 76 and engages both the rotor disk 54 and the inner surface of the top wall 38 of the cover 28 so as to seal the passage between the cover and the rotor.

Contact 18 comprises a thin, flat circular plate 66 of an electrically conductive metal. An arm 68 is integral with and projects radially from the plate 66. The arm 68 extends under the stop lug 60. A pair of drive lugs 69 extend upwardly from opposite sides of the arm 68 and fit into the notches 62 in the rotor stop lug 60. A flange 70 is integral with and extends downwardly from the end of the arm 68. A pair of parallel spring fingers 72 are integral with and extend from a side edge of the flange 70. The fingers 72 extend back along the flange between the flange and the resistance element 14 and the ends of the fingers slidably engage the resistance film 48 of the resistance element. A hole 73 is provided in the center of the plate 66 and a tab 74 is lanced out of the center of the plate 66 at the edge of the hole 73. As shown in FIG. 1, the end of the upright portion 24a of the contact terminal wire 24 extends through the hole 73 in the contact plate 66. The hole 73 is smaller than the contact termination wire 24 so that the tab 74 is bent slightly upwardly. Thus, the tab resiliently engages the contact terminal wire 24. Thus, the contact 18 is connected to the rotor 16 so as to rotate therewith, and is electrically connected to both the resistance film 48 and the contact terminal wire 24 so as to electrically connect the resistance element 14 to the contact terminal wire 24.

To assemble the potentiometer 10 of the present invention, the resistance element 14 is first placed on the base 26 and the resistor terminal wires 20 and 22 connected to the termination films 50a and 50b. After the insulating sheet 52 is placed over the resistance element 14, the contact 18 is mounted on the contact terminal wire 24 with the drive lugs 69 extending upwardly. The rotor 16 is then placed over the contact 18 with the drive lugs 69 fitting into the notches 62. With the sealing ring seated on the rotor 16, the cover 28 is mounted on the base 26 with the rotor hub 56 extending through the opening 42 and the cover tabs 40 extending through the notches 30 in the base. The cover tabs 40 are then bent under the base 26 to secure the cover 28 to the base and complete the assembling of the potentiometer. Thus, it can be seen that the potentiometer 10 is made up of a minimum number of parts which can be easily and quickly assembled even though the parts may be very small in size.

Referring to FIGS. 6 and 7, there is shown a modification of the potentiometer of the present invention, generally designated as $10^1$ which includes a fixed resistance electrically connected in a series-parallel arrangement with the variable resistance element. Potentiometer $10^1$ is identical in construction to the potentiometer 10 described above except as to the construction of the resistance element $14^1$ and the contact terminal wire $24^1$.

The resistance element $14^1$ comprises a flat, circular disk 44¹ of an electrical insulating material having the non-circular opening 46¹ in the center thereof which receives the non-circular post 32¹ of the base 26¹. A variable resistance film 48¹ and a fixed resistance film 80 are coated on the peripheral edge of the disk 44¹ with the length of the variable resistance film 48¹ around the edge of the disk 44¹ being much greater than the length of the fixed resistance film 80. The variable resistance film 48¹ extends from adjacent one side of the base stop lug 34¹ to a point slightly spaced from the other side of the base stop lug. The fixed resistance film 80 extends across the end of the base stop lug 34¹. A termination film 50b¹ extends across the edge of the disk 44¹ at the end of the variable resistance film 48¹ which is adjacent the stop lug 34¹. The termination film 50b¹ is also electrically connected to one end of the fixed resistance film 80. The upright portion 22a¹ of the resistor terminal wire 22¹ is connected to the termination film 50b¹ by either solder or an electrically conductive cement. A termination film 82 is coated across the edge of the disk 44¹ at the other end of and contacting the fixed resistance film 80. The upright portion 20a¹ of the resistor terminal wire 20¹ is connected by either solder or an electrically conductive cement to a termination film 50a¹ coated across the edge of the disk 44¹ at the other end of the variable resistance film 48¹.

The contact terminal wire 24¹ is U-shaped having a base 84 and a pair of parallel legs 86 and 88. The base 84 of the contact terminal wire 24¹ is embedded in and extends radially along the base 26¹ of the housing. The leg 86 extends upwardly along the center of the post 32¹ of the housing base 26¹ and projects beyond the top of the post 32¹. The end of the leg 86 extends through the hole 73¹ in the contact 18¹ and is contacted by the tab 74¹ of the contact 18¹. The leg 88 extends upwardly from the housing base 26¹ along the fixed resistor termination film 82, and is connected thereto by either solder or an electrically conductive solder. Thus, the fixed resistance film 80 is electrically connected between the resistor terminal wire 22¹ and the contact terminal wire 24¹, and is electrically connected in a series-parallel arrangement with the variable resistor film 48¹ through the contact terminal wire 24¹ and the contact 18¹. As the contact fingers 72¹ are moved along the variable resistance film 48¹ by rotating the rotor 16¹, the resistance value of the potentiometer 10¹ between the resistor terminal wires 20¹ and 22¹ is the resistance value of the portion of the variable resistance film 48¹ between the resistor terminal wire 20¹ and the contact fingers 72¹ plus the parallel arrangement of the resistance values of the fixed resistance film 80 and the remaining portion of the variable resistance film.

Referring to FIGS. 8–13, another modification of the trimmer potentiometer of the present invention is generally designated as 90. In general, potentiometer 90, like potentiometer 10 of FIGS. 1–5, comprises a cylindrical housing, generally designated as 92, a resistance element 94 mounted in the housing 92, and a rotor 94 rotatably mounted in the housing and projecting through an opening in the housing. A contact 98 is carried by the rotor and slidably engages the resistance element 94. Three terminal wires 100, 102 and 104 extend through the housing 92 with the terminal wires 100 and 102 being connected to the resistance element 94 and the terminal wires 104 being connected to the contact 98. Thus, rotation of the rotor 96 moves the contact 98 along the resistance element 94 to vary the resistance value setting of the potentiometer 10.

More specifically, the housing 92 comprises a base 106 and a cover 108. The base 106 is a flat, circular disk of an electrical insulating material, such as a plastic. A thin, annular flange 110 extends radially outwardly from the edge of the base 106 at the bottom surface thereof. The flange 110 has three, circumferentially spaced notches 112 therein (see FIG. 13). A circular post 114 is integral with and projects upwardly from the center of the base 106. The post 114 has a pair of diametrically opposed, longitudinally extending recesses 116a and 116b in its cylindrical surface, and a recess 116c extending transversely across the top thereof and connecting the recesses 116a and 116b. A narrow rib 118 projects from the top surface of the base 106 and extends substantially 230° around the base. The rib 118 is spaced from and concentric with the post 114. A pair of spaced small lugs 120 project from the top surface of the base 106. The lugs are positioned on the same circle as the rib 118 and are between the ends of the rib 118.

As shown, resistor terminal wires 100 and 102 are mounted on and secured to the base 106 during the molding of the base. The resistor terminal wires 100 and 102 have upper portions 100a and 102a respectively which extend upwardly from the top surface of the base 106 at opposite ends of the rib 118 (See FIG. 12), and intermediate bent portions 100b and 102b respectively which are completely within and extend across a portion of the base 106 (see FIG. 9) so as to mechanically secure the terminal wires 100 and 102 to the base. The contact terminal wires 104 has a U-shaped upper portion 104a which extends upwardly through the recess 116a in the post 116, across the recess 116c in the top of the post and downwardly through the recess 116b in the post.

The cover 108, which is made of metal, is cup-shaped having a cylindrical outer wall 122 and a flat, circular top wall 124. The outer wall 122 of the cover 108 is mounted on the base 106. Three spaced tabs 126 project from the end of the outer wall 122 (see FIG. 12). The tabs 126 extend through the notches 112 in the flange 110 of the base 106, and, as shown in FIG. 13, are bent across the bottom surface of the base 106 to secure the cover 108 to the base. The top wall 124 of the cover 108 has a circular central opening 128 therethrough. A stop lug 130 projects radially inwardly from the edge of the opening 128 in the top wall 124 (see FIG. 12).

Figure 12:
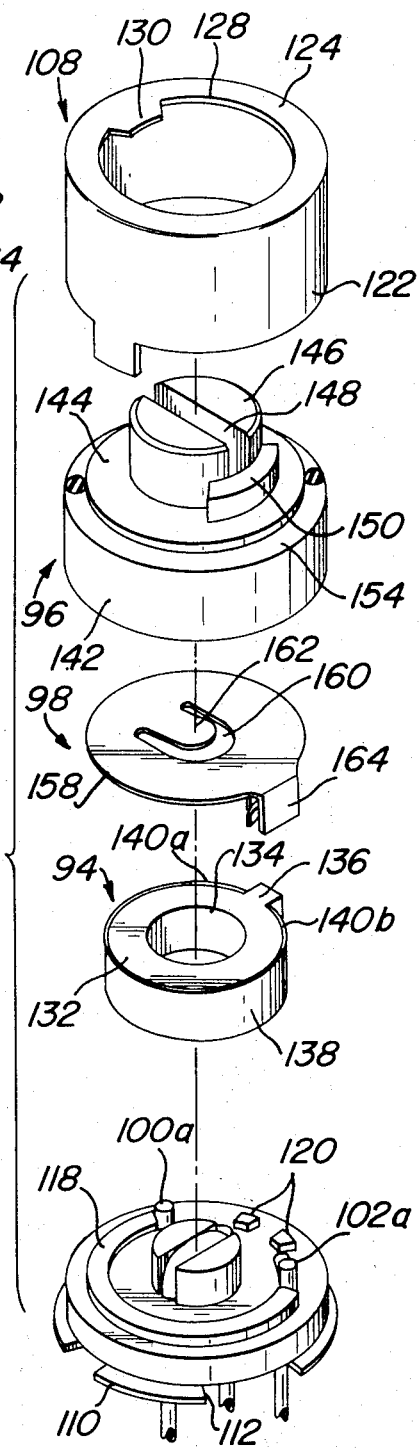
FIG. 12 is an exploded perspective view of the modification of the trimmer potentiometer shown in FIG. 8.
Figure 13:
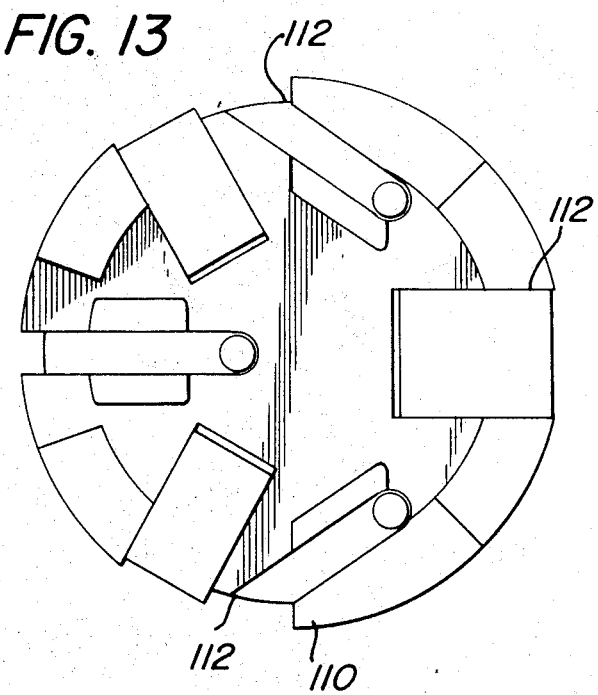
FIG. 13 is a bottom plan view of the trimmer potentiometer of FIG. 8.

Resistance element 94 comprises a flat, circular disk 132 of an electrical insulating material, such as a ceramic or plastic, having a circular opening 134 through the center thereof and a lug 136 projecting radially outwardly from its outer periphery (see FIG. 12). The opening 134 in the disk 132 is of the same diameter as the post 114 on the base 106. The radial thickness of the disk 132 is substantially equal to the radial spacing between the post 114 and the rib 118 on the base 106, and the width of the lug 136 is substantially equal to the distance between the lugs 120 on the base. The disk 132 is seated on the base 106 with the post 114 extending through the opening 134 in the disk and with the lug 136 fitting between the lugs 120 to prevent relative rotation between the disk and the base. The disk 132 is of a height slightly less than the height of the post 114.

A film 138 of a resistance material is coated on and extends around the peripheral edge surface of the disk 132. The resistance film 138 like the resistance film 48 of the potentiometer 10 of FIGS. 1–5, may be of any well-known electrical resistance. The resistance film 138 extends substantially completely around the peripheral edge surface of the disk 132 but terminates short of the sides of the lug 136. Termination films 140a and 140b of an electrically conductive material are coated across the peripheral edge of the disk 132 at the ends of and contacting resistance film 138. As shown in FIG. 11, the upright portions 100a and 102a of the resistor terminal wires 100 and 102 extend along the termination films 140a and 140b respectively, and are electrically connected thereto by either a solder or an electrically conductive cement. Thus, the resistor terminal wires 100 and 102 are electrically connected to opposite ends of the resistance film 138. This also mechanically secures the resistance element 94 to the base 106 of the housing 92.

Rotor 96 comprises a cylindrical cup-shaped member of an electrical insulation material, such as a plastic, having a cylindrical outer wall 142 and a circular top wall 144. The cylindrical outer wall 142 is of an outer diameter substantially equal to the diameter of the base 106 and is of a thickness substantially equal to the distance between the edge of the base 106 and the annular rib 118. The height of the cylindrical outer wall 142 is substantially equal to the distance between the base 106 and the top wall of the cover 108. The rotor 96 is mounted in the housing 92 with the end of the outer wall 142 seated on the base 106 and with the outer wall surrounding the resistance element 94. A circular hub 146 is integral with and projects upwardly from the center of the top wall 144. The hub 146 is smaller in diameter than the diameter of the opening 128 in the top wall 124 of the cover 108, and projects through the opening 128 so as to be accessible from outside the cover 108. A transverse slot 148 is provided across the top surface of the hub 146. The slot 148 is adapted to receive a screw driver or similar tool to rotate the rotor 96. A wedge-shaped stop lug 150 projects upwardly from the top wall 144 of the rotor 96 alongside the hub 146. The stop lug 150 also projects through the opening 128 in the top wall 124 of the cover 108 and is adapted to engage the sides of the stop lug 130 on the cover so as to limit the degree of rotation of the rotor 96. As shown in FIG. 11, the outer wall 142 has a longitudinally extending groove 152 in its inner surface. The groove 152 is in radial alignment with the stop lug 150 on the rotor 96. An annular groove 154 is provided in the upper surface of the top wall 144 of the rotor 96 at the edge thereof. An annular sealing ring 156 is seated in the groove 154 and engages both the rotor 96 and the inner surface of the top wall 124 of the cover 108 so as to seal the passage between the cover and the rotor.

Contact 98 comprises a thin, flat circular plate 158 of an electrically conductive metal. The plate 158 is a diameter substantially equal to the inner diameter of the outer wall 142 of the rotor 96 so that the plate 158 fits tightly within the rotor against the inner surface of the top wall 144 (see FIGS. 8 and 9). The plate 158 has a U-shaped opening 160 through its center which provides a spring contact tab 162 (see FIG. 12). The contact tab 162 slidably engages the top portion 104a of the contact terminal 104 so that the contact 98 is electrically connected to the contact terminal. A flange 164 is integral with and extends downwardly from the edge of the plate 158. As shown in FIG. 11, the flange 164 fits in the groove 152 in the outer wall 142 of the rotor 96 so as to provide a drive connection between the rotor and the contact. A pair of parallel spring fingers 166 are integral with and extend from a side edge of the flange 164. The springer fingers 166 extend back along the flange 164 between the flange and the resistance element 94, and the ends of the fingers slidably engage the resistance film 138 of the resistance element. Thus, the contact 98 is connected to the rotor 96 so as to rotate therewith, and is electrically connected to both the resistance film 138 and the contact terminal 104 so as to electrically connect the resistance element 94 to the contact terminal wire 104.

The potentiometer 90 is assembled in substantially the same manner as the potentiometer 10 of FIGS. 1–5 previously described. Also, the potentiometer 90 can be provided with a fixed resistance electrically connected in a series-parallel arrangement with the variable resistance element in the manner described with regard to the potentiometer 10[1] of FIGS. 6 and 7.

The present invention may be embodied in other specific forms without departing from the spirit or essential attributes thereof, and, accordingly, reference should be made to the appended claims, rather than to the foregoing specifications as indicating the scope of the invention.

We claim:

1. A trimmer potentiometer comprising:
   a cylindrical housing having a circular base and a cup-shaped cover mounted on and secured to said base, said base having a post projecting from the center of the inner surface thereof, and the cover having a circular opening in its surface opposite the base;
   a resistance element seated on the inner surface of said base, said resistance element comprising a circular disk of an electrical insulating material having a central opening therethrough through which the post on the base extends, and a film of an electrical resistance material coated on the periphery edge of the disk;
   a cylindrically shaped rotor rotatably mounted in the housing over the resistance element, said rotor having a hub projecting through the opening in the cover so as to be accessible from the outside housing, and having a depending side wall spaced about the resistance element;
   a metal contact mounted within the rotor and drivingly connected to said rotor, said contact having a finger located between the depending side wall of the rotor and the resistance element slidably engaging the resistance film, a pair of resistance terminal wires extending through and secured to the base of the housing, said resistance terminal wires being electrically connected to said resistance film at spaced points along the resistance film; and a contact terminal wire having an end portion extending through the post of the base and slidably engaging the contact.

2. A trimmer potentiometer in accordance with claim 1 in which the contact comprises a flat, metal plate mounted between the rotor and the resistance element, a flange is connected to the plate and extends across the peripheral edge of the resistance element, and the finger extends from the flange between the flange and the resistance element and slidably engages the resistance film.

3. A trimmer potentiometer in accordance with claim 2 in which the contact plate has a hole therethrough and a tab extending from the plate at the edge of the hole, and the contact terminal wire extends through the center of the post of the base with the end portion of the contact terminal wire extending through said hole in the contact plate and slidably engaging said tab on the contact plate.

4. A trimmer potentiometer in accordance with claim 2 in which the contact terminal wire extends through the post on the base adjacent the surface of post and has a U-shaped end portion extending across the top of the post and the tab extends from the plate of the contact and slidably engages the end portion of the contact terminal wire.

5. A trimmer potentiometer in accordance with claim 2 in which the rotor has a notch formed in its depending side wall, and the contact has a flange disposed in said notch so as to drivingly connect the contact to the rotor.

6. A trimmer potentiometer in accordance with claim 2 in which the rotor is cup-shaped having a cylindrical outer wall extending around the resistance element and a top wall extending over the element, the outer wall has a longitudinally extending groove in its inner surface, the plate of the contact is seated against the inner surface of the top wall of the rotor and the flange of the contact fits in the groove in the outer wall to prevent relative rotation between the contact and the rotor.

7. A trimmer potentiometer in accordance with claim 1 in which a stop lug extends radially inwardly from the edge of the opening in the cover and a stop lug projects upwardly from the rotor adjacent the hub, the rotor stop lug being engageable with the cover stop lug to limit the degree of rotation of the rotor.

8. A trimmer potentiometer in accordance with claim 1 in which the disk of the resistance element has a lug projecting radially from the peripheral edge thereof and the base of the housing has a pair of lugs projecting from its top surface and positioned on opposite sides of the lug on the resistance element so as to prevent relative rotation between said resistance element and the base.

9. A trimmer potentiometer in accordance with claim 1 including a second resistance film coated on the peripheral edge of the resistance element disk, one end of said resistance film being electrically connected to one end of the first said resistance film, and the contact terminal wire has a second end portion which is electrically connected to the other end of the second resistance film.

10. A trimmer potentiometer in accordance with claim 11 in which the contact terminal wire is U-shaped having a base and a pair of spaced parallel legs, the base of the contact terminal wire being embedded in the base of the housing with one leg of the contact terminal wire extending along the center of the post on the base and engaging the contact, and the other leg of the contact terminal wire projecting from the inner surface of the base along the peripheral edge of the resistance element and being electrically connected to the other end of the second resistance film.

References Cited

UNITED STATES PATENTS

| | | | |
|---|---|---|---|
| 3,237,140 | 2/1966 | Barden et al. | 338—184 X |
| 3,456,227 | 7/1969 | Paine et al. | 338—164 |
| 3,484,734 | 12/1969 | Casey et al. | 338—162 |

LEWIS H. MYERS, Primary Examiner

D. A. TONE, Assistant Examiner

U.S. Cl. X.R.

338—171